United States Patent
Nagase

[15] 3,671,617
[45] June 20, 1972

[54] METHOD OF DRAWING THERMOPLASTIC SYNTHETIC RESIN FILM OVER A POLYANGULAR MANDREL

[72] Inventor: Sadao Nagase, Mie, Japan

[73] Assignee: Mitsubishi Petrochemical Co., Ltd., Tokyo, Japan

[22] Filed: Dec. 1, 1969

[21] Appl. No.: 881,096

[30] Foreign Application Priority Data

Oct. 22, 1969 Japan.................................44/84436
Nov. 30, 1968 Japan.................................43/87799

[52] U.S. Cl. ...........................264/89, 264/95, 18/1 FB, 18/14 S
[51] Int. Cl.......................................................B29c 23/00
[58] Field of Search ..................18/1 FB, 14 A, 14 S; 264/95, 264/209, 290, 89

[56] References Cited

UNITED STATES PATENTS

| | | |
|---|---|---|
| 3,166,616 | 1/1965 | Bild et al...................................264/95 |
| 3,217,361 | 11/1965 | Ryan et al...................................18/14 |
| 2,695,420 | 11/1954 | Longstreth et al..................18/14 S X |
| 3,061,875 | 11/1962 | Gerow.....................................264/95 |

FOREIGN PATENTS OR APPLICATIONS

| | | |
|---|---|---|
| 431,619 | 7/1935 | Great Britain..........................18/14 S |
| 977,473 | 12/1964 | Great Britain..........................264/95 |
| 1,140,700 | 12/1962 | Germany................................18/14 S |
| 954,432 | 4/1964 | Great Britain..........................264/95 |

*Primary Examiner*—Robert F. White
*Assistant Examiner*—Jeffery R. Thurlow
*Attorney*—Sughrue, Rothwell, Mion, Zinn & Macpeak

[57] ABSTRACT

A method of drawing a tubular thermoplastic resin film comprising transporting said tubular film onto a mandrel which has a polyangular conical shape, causing the uniform occurrence of necking initiation points around the circumference of said film by drawing said film around said mandrel, and continuing to draw said film by the action of fluid pressure exerted within said film after said film has passed over said mandrel.

6 Claims, 6 Drawing Figures

PATENTED JUN 20 1972 3,671,617

INVENTOR
SADAO NAGASE

METHOD OF DRAWING THERMOPLASTIC SYNTHETIC RESIN FILM OVER A POLYANGULAR MANDREL

BACKGROUND OF THE INVENTION

1. Field of the Invention

The present invention relates to method for drawing thermoplastic synthetic resin film in tubular form, and more particularly, to a method of drawing thermoplastic synthetic resin film in tubular form in a biaxial direction.

2. Description of the Prior Art

In order to draw thermoplastic synthetic resin film in tubular form in a biaxial direction, it is imperative to draw the tubular film in the axial direction and also in the direction of its circumference.

Heretofore, in order to draw the tubular film in the circumferential direction, several methods have been utilized. For instance, a mechanical method has been employed wherein the tubular film is transported around the outer periphery of a conical drawing core body thereby gradually increasing the diameter of the film. A second method is termed the air pressure method, wherein compressed air is introduced into the interior of the tubular film thereby causing the film to expand by reason of the air pressure. However, the former method results in increased frictional resistance between the film and the drawing core body, and, because of this, drawing was found to be difficult, and at the same time, the movement of film on the drawing core body was not smoothly performed. In addition, the film was subjected to longitudinal striping and unevenness, and whitening occurred due to the scratching of the film by the drawing core body.

The latter, compressed air method, which utilizes the natural swelling of the film, has caused the drawing point to occur only in one area of the film, and because only this area was concentratively drawn, various defects in the film have occurred; for example, the performance of the film becomes unstable and, at the same time, unevenness in the thickness of the film tends to increase.

In general, films comprised of crystalline polymers, particularly high molecular weight crystalline polymers such as polypropylene, are not uniformly deformed when drawn, and as a result, both drawn and undrawn portions coexist on the film. The boundary between these two portions is generally called the necking initiation point or necking initiation line, and due to the transfer of the necking initiation point to the undrawn portion, drawing takes place. If a plurality of necking initiation lines occurs in an equal distribution on the surface of the tubular film, drawing takes place under uniform conditions. However, if the necking initiation lines occur nonuniformly in one specific location, or in several locations concentratively in the direction of the circumference, then the drawing area tends to be deviated or changed, resulting in the partial swelling of the film, bursting of the tube and such inconvenient problems as inadvertent contact of the film with the outer tube heater, or the like. Such problems result, for example, when the film thickness prior to drawing is not uniform, the film heating is not carried out uniformly, or when a portion of the film is low in tensile strength. If such should happen, the thin portion of the film or the weak portion thereof urges drawing, and due to the fact that only this portion swells greatly, it touches the outer heater. The touched portion, due to excessive heating by the heater, tends to be in a softened or molten condition and, as a result, the film bursts.

In order to eliminate the above-described defects, various methods have been proposed, for example, as disclosed in Japanese Pat. publication Nos. 6834/64, 8486/66 and 25794/67. These patents describe control of the temperature, uniform operation of the heating method, and the selection of the optimum temperature variation, etc. In spite of these proposed improvements, non-uniform drawing could not be eliminated, and where a nonuniform state existed in the resin film, stable drawing was hardly ever feasible. As a result, the production of this type film was low despite the fact that high-level operations were required as being essential.

Accordingly, it is a principal object of the present invention to alleviate the above-described disadvantages and to provide a method of uniformly drawing a thermoplastic resin film.

SUMMARY OF THE INVENTION

According to the present invention, a tubular film is transported onto a polyangular mandrel (i.e., a conically shaped mechanism adapted to be either enlarged or restricted—hereinafter referred to as a mandrel) which is provided with a plurality of arms in a radial direction, while, at the same time, fluid pressure is charged into the conical space within the film by the film being forced over the mandrel. A tubular film is thus continuously drawn by the action of both mechanical force and fluid pressure, thereby successfully eliminating the above-described defects.

In order to amplify the present summary, the following explanation is given. The mandrel is designed to provide a motivation for the film to start the drawing or necking initiation point at a point approximately in the middle of each edge of the mandrel, thus creating the motivation to urge the drawing in the circumferential direction of the tubular film. Thereafter, any further increase in the drawing of the film is effected by the fluid pressure inside the tube. By elongating the length of each mandrel edge, thus enlarging the degree to which the film may be drawn on the mandrel, from 25 to 90 percent of the desired degree of drawing may be realized while the film remains on the mandrel, with the remaining 75 to 10 percent being accomplished by the action of the fluid pressure inside the tubular film.

DETAILED DESCRIPTION OF THE PREFERRED EMBODIMENTS

Figure 1:
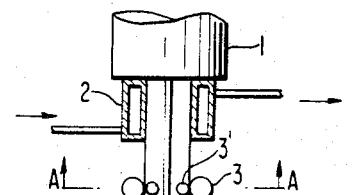
FIG. 1 illustrates an apparatus used for drawing a tubular film according to the present invention.

Referring to FIG. 1, a molten crystalline polymer is subjected to intimate blending and is extruded downwardly from annular die 1 in the form of tubular undrawn film $a$. Film $a$ is then subjected to rapid cooling by means of cooling cylinder 2. Cooling cylinder 2 has a sufficient length to surround the tubular film until the molten film $a$ is cooled from the outside and solidified, and prevents the film from being burst by the fluid pressure inside.

Figure 2:
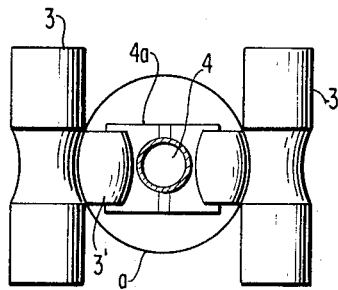
FIG. 2 is a sectional view along the line AA of FIG. 1.

Undrawn film $a$ is taken out by a pair of pinch rollers 3, 3' at a fixed velocity. The first pinch roller 3, 3', as illustrated in FIG. 2, consists of a freely revolving roller 3', i.e., a pair of drum type rollers, supported by frame 4a in linkage with mandrel supporting rod 4 extending downwardly from the center of die 1 through the interior of film $a$, and also consists of a hand drum type driving roller 3 which functions to apply pressure from the exterior of the film $a$ to roller 3'. In this position, film $a$ is provided from outside through the central orifice of the die 1, and the central orifice of the rod-shaped mandrel supporting rod 4, and is maintained approximately in a cylindrical shape due to the drawing pressure of the fluid.

Thereafter, film $a$ passes through the interior of heater 6 which has a deltaic reverse conical shape. Heater 6 heats film $a$ until it reaches the optimum drawing temperature, and then film $a$ passes downwardly onto mandrel 5, thereby opening the film in a conical shape.

In this portion of the apparatus, the film is uniformly drawn by a factor of more than 1.5 times in the circumferential direction, and necking initiation takes place, which provides a motivation to urge drawing, as will be described hereinbelow in detail.

Figure 3:
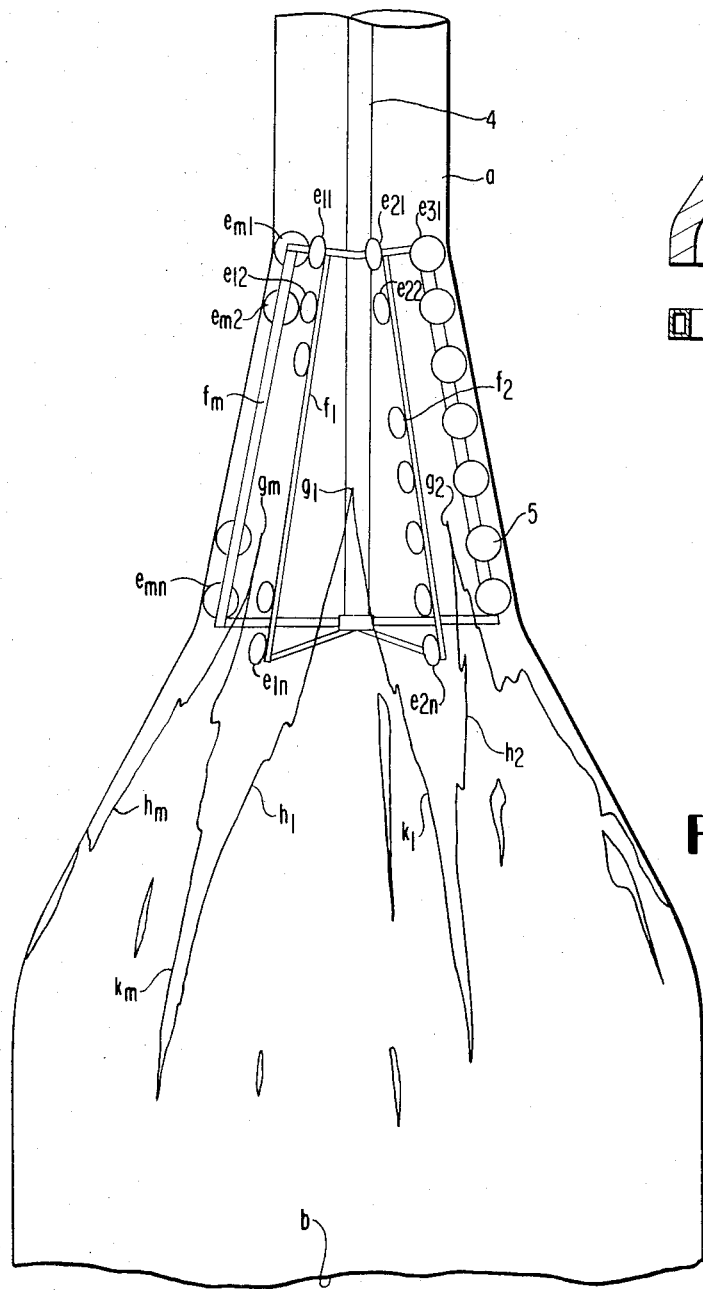
FIG. 3 represents an enlarged side view of the mandrel of the present invention.

As illustrated in FIG. 3, mandrel 5 comprises mandrel supporting rod 4 as the central line thereof, and consists of $m$ number of arms $f_1, f_2$ to $f_m$ which are in a slanting position in a normal polyconical shape. Within the arms are supported, in a radial direction, $n$ number of wheels $e_{11}, e_{12}$ to $e_{1n}; e_{21}, e_{22}$ to $e_{2n}; e_{m1}, e_{m2}$ to $e_{mn}$, respectively for each arm, numbered consecutively from the top to the bottom of the mandrel. Film $a$ is transported smoothly to the lowermost wheels $e_{1n}, e_{2n}$ to $e_{mn}$ by means of the uppermost wheels $e_{11}, e_{21}$ to $e_{m1}$. Consequently, the film between $e_{11}$ and $e_{21}$ is drawn to the extension between $e_{1n}$ and $e_{2n}$ over the respective circumference. At the time of the drawing of film $a$, the possibility that the film portion between, for example, wheels $e_{11}$ and $e_{21}$ will be transported to the area between wheels $e_{21}$ and $e_{31}$ is so small that it may be ignored, and consequently, the film area surrounded by wheels $e_{11}, e_{1n}, e_{2n}$ and $e_{21}$ remains independent from other areas. Because of this fact, the film area between wheels $e_{11}$ and $e_{21}$ is forcibly transported to the area between wheels $e_{1n}$ and $e_{2n}$, and thus, if the crystalline polymer exceeds a certain drawing magnification after the drawing of the non-crystalline portion has taken place, the lamellar unraveling or the necking initiation point $g_1$ will be located about the middle of adjacent arms. With this as a starting point, necking initiation lines $h_1, k_1$ etc., will spread toward the peripheral areas. In the area between the other arms, similar necking initiation points $g_2, g_3$ to $g_m$ will occur one by one, and from these initiation points will spread necking initiation lines $h_2, k_2, h_3, k_3$ to $h_m, k_m$. In this manner, by virtue of mandrel 5, it is seen that $m$ number of necking initiation points, corresponding to the number of arms, will occur on the circumference of the film, at equal intervals thereon.

Below mandrel 5, film $a$ is drawn in the direction of its circumference only by virtue of air pressure. By effecting the drawing of the film in the direction of its circumference as mentioned above, heater 6 is constructed such that the movement of the film in an upward and downward direction and the temperature distribution on the circumference can be freely modified as desired by applying heat to film $a$ from the outside.

Film $b$, which is drawn in the direction of its circumference, is then subjected to a uniform cooling by means of air applied from air ring 7. Any suitable means may be employed instead of air ring 7, as, for example, a water cooling tank.

Thereafter, film $a$ is flatly folded by a plurality of guide rollers 8,8 etc., and is taken out at a fixed velocity by a second pinch roller 9 positioned downwardly therefrom. The circumferential velocity of this second pinch roller is greater than that of the first pinch roller 3 by a degree corresponding to the desired longitudinal magnification, and therefore, film $b$ is subjected to longitudinal drawing in the portion between the first and second pinch rollers.

Thereafter, film $b$ is subjected to conventional steps, such as thermosetting, surface treatment and winding, etc.

In the above-described embodiment of this invention, the wheels are provided in the mandrel arms. However, it is possible to incorporate the use of rollers, belts and balls, or the like, in place of the wheels. Similarly, if the arm itself has applied thereto a friction-reducing coating, such as a fluorine resin, or the like, it is possible to allow the film to smoothly move on the arm itself.

The present invention is so devised that the film on the mandrel is drawn to such an extent that the necking initiation point takes place, the motivation to urge the drawing of the film occurs, and the drawing can be accomplished by a greater magnification in the circumferential direction with only fluid pressure in a position past the mandrel. Because of these reasons it is possible to generate the necking initiation points at uniform intervals around the circumference of the film even when the film is internally defective or has a non-uniform thickness or there is a non-uniformity in heating, or the like. Thus, there is no danger of partial swelling of the tube during the drawing, and therefore, uniform drawing can be expected while maintaining a circular cross-section. At the same time, the film surface is free from scratches and there is no unevenness in product quality.

When using a device which only employs a mechanical drawing of a film, wheel tracks and uneven spots, or the like, occur on the film surface, and, in addition, the frictional quotient becomes so great that no high-velocity operation is feasible. On the contrary, according to the present invention, the mandrel can be used for the purpose of providing necking initiation points to the film, and because the drawing of greater magnification is carried out only by virtue of the fluid pressure applied, it goes without saying that the film surface will be free from whitening due to contact with the mandrel, softening or unevenness and scratches, or the like. Further, because the mechanical friction is quite small, it is feasible to produce the film at an extremely high velocity.

Another embodiment of the present invention will be described below.

Figure 4:
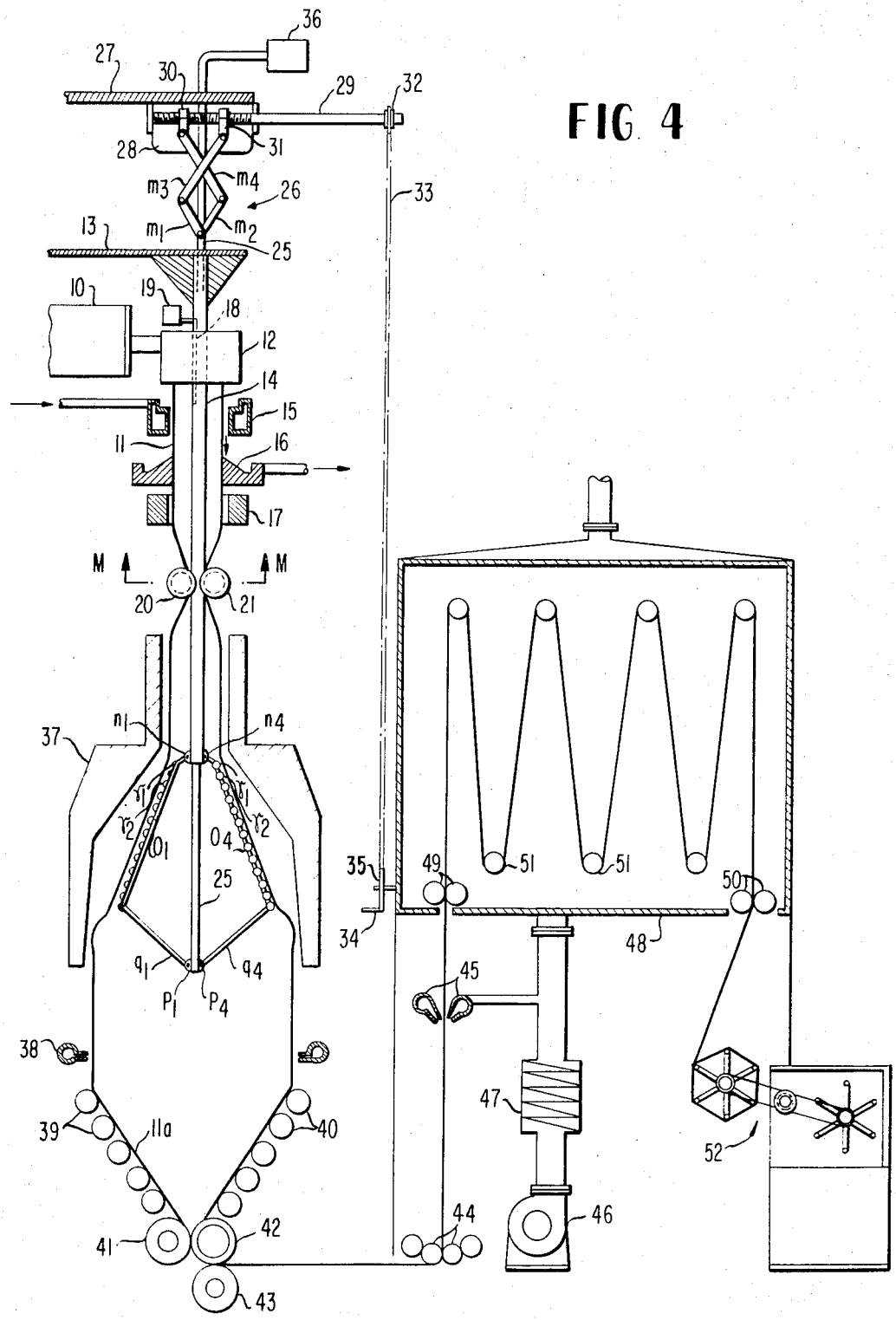
FIG. 4 represents another embodiment of the apparatus of the present invention.

Referring to FIG. 4, in the extreme end of extruder 10 is provided an annular die 12 which downwardly extrudes film in tubular shape 11.

Pipe 14 is fixedly secured at its uppermost point by plate 13, and extends downwardly through the center of annular die 12.

Surrounding film 11 immediately below annular die 12 are provided, respectively, ring 15 used for releasing cooling water directed to film 11, water-receiving receptacle 16 that receives the water and heater 17 for drying purposes. The space within film 11 between the die 12 and pinch rolls 20, 21 is provided with compressed air from air pressure source 19 by means of orifice 18 extending through the inside of pipe 14.

Within said pipe 14 is inserted a smaller pipe 25 to effect the movement thereof. The upper portion of smaller pipe 25 extends upwardly from plate 13 to link with the ascending-descending device 26 in the pantographic shape.

Figure 5:
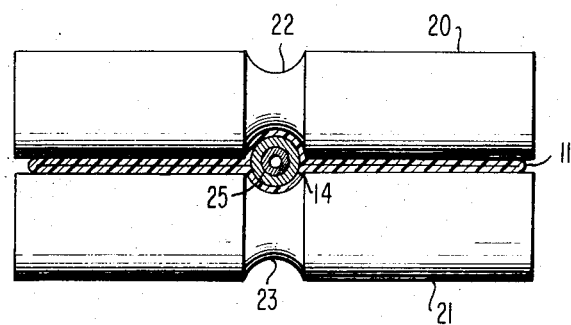
FIG. 5 represents a sectional view along the line MM of FIG. 4.

In a position below heater 17 is provided the first pinch roll 20,21 that pinches the film. In the respective centers of these pinch rolls are provided grooves 22 and 23, the cross-sectional views of which are in the semicircular shape, as illustrated in FIG. 5. In the space between these grooves 22 and 23 and the pipe 14 there exists an interval corresponding to the thickness of the film 11.

The ascending-descending device 26 consists of four links $m_1, m_2, m_3$ and $m_4$, each being interlinked together in the shape of a pantograph. In support 28 which is in turn supported by fixing plate 27 a guide screw 29 is fixedly supported. Nuts 30 and 31 are positioned on guide screw 29 in such a manner that they will not freely rotate. Nuts 31 and 30 are connected with the upper ends of links $m_3$ and $m_4$, respectively. Guide screw 29 is connected with a chain wheel 35 having a handle 34, by means of chain wheel 32 and chain 33.

In the lower end of pipe 14, at equally-spaced radial intervals, are provided ordinates $n_1, n_2$ etc., extending in a radial direction. In ordinates $n_1, n_2$ etc. are encased the upper ends of several mandrels $O_1, O_2$ etc. Also in the lower end of smaller pipe 25 are provided ordinates $p_1, p_2$ etc., extending in radial directions corresponding to the lower ends of ordinates $n_1, n_2$ etc. Ordinates $p_1, p_2$ etc., and said mandrels $O_1, O_2$ etc., are connected with each other by means of links $q_1, q_2$ etc. Mandrels $o_1, o_2$ etc., are provided with a plurality of rollers $\gamma_1, \gamma_2$ etc. along the length of the mandrels. The upper end of smaller pipe 25 is interconnected with air pressure source 36, the lower end of which is opened inside the extended film 11.

Surrounding the above-mentioned mandrel is a tubular heater 37 which effects heating at a temperature suitable for carrying out the drawing. In a position below the heater 37 is provided a cooling ring 38 which releases cooling water. In a position below cooling ring 38 are provided guide rolls 39, 39, etc., 40, 40, etc., which gradually guide the film 11$a$ into a flat belt shape. Second pinch rollers 41, 42 are provided which pinch film 11$a$. The circumferential velocity of the second pinch rollers 41, 42 is much faster than the velocity of the first pinch rollers 20, 21. A nip roller 43 is operably connected with pinch roller 42.

Nip rollers 44, 44, etc., and air knife 45 are provided to aid in the removal of water from the film. Air knife 45 is supplied with air by blower 46 through heater 47.

In thermosetting oven 48 is provided nip rollers 49, 49, 50, 50 for use in driving the film 11, and guide rollers 51, 51, etc.

Winder 52 is provided at the exit of the oven.

The manner of operation of the apparatus of the present invention is given below. The synthetic resin crystalline polymer extruded from the extruder 10 is forced downwardly in the form of a tubular film tube from die 12 and is further transported downwardly while being maintained at a certain diameter by virtue of the compressed air being blown in from inside. While said film 11 is transported downwardly, it is cooled to an appropriate temperature by means of water released uniformly in the direction of circumference from the ring 15, and the water is removed by water receiving receptacle 16. In this stage, water drops adhere to film 11, but these water drops are subsequently evaporated due to heating by heater 17, and thus film 11 is dried.

Figure 6:
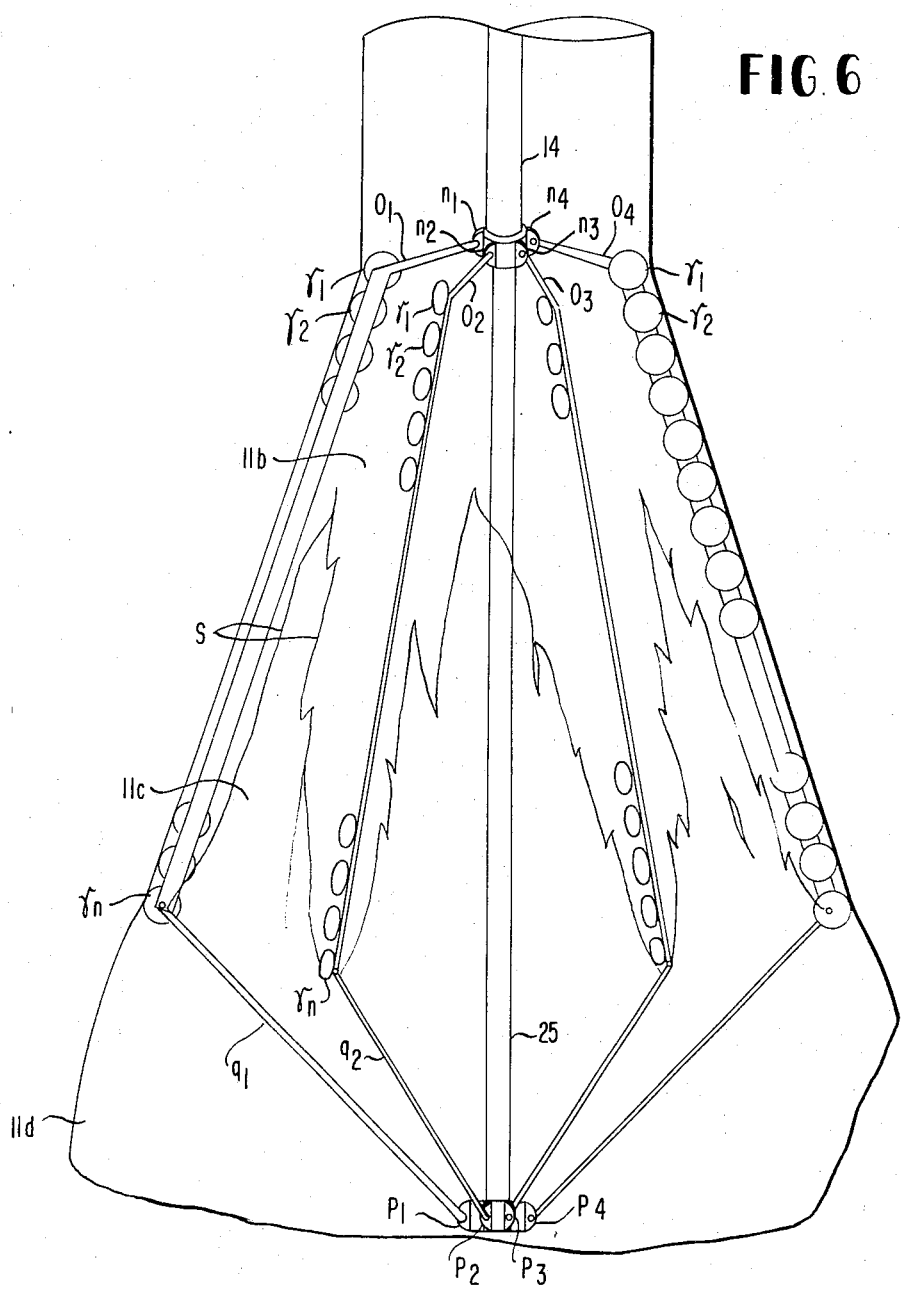
FIG. 6 is a side view of the drawn portion of FIG. 5.

The dried film 11 is pinched by the first pinch rollers 20 and 21, and is transported downwardly at a certain velocity. Thereafter, film 11 is heated at a temperature suitable for carrying out the drawing inside the heater 37. This temperature is preferably between 90° and 150° C in the case of polypropylene. Thereafter, the film 11 passes by the exterior of the drawing rollers $\gamma_1$, $\gamma_2$, etc., supported by mandrels $O_1$, $O_2$, etc. Thereafter, the film is spread out in a conical shape. Simultaneously, the heated air from air pressure source 36 is blown into the interior of the conical portion of film 11 by way of smaller pipe 25. Consequently, both mechanical tensile strength from the expansion caused by drawing rollers $\gamma_1$, $\gamma_2$, etc. and tensile strength due to the inside air pressure act on film 11, and thus, film 11 is drawn in the direction of its circumference. When film 11 is drawn, its thickness rapidly decreases through the medium of a bordering line S (see FIG. 6) by a thin layer 11c, so that the thickness thereof has been diminished to the thickness of layer 11d by a factor of from ¼ to 1/36, that is, through the medium of the necking line. The bordering line indicates the line wherein the orientation is taking place for the molecular chain inside the crystalline polymer. The bordering line S, as illustrated in FIG. 6, extends from points approximately ⅓ the distance from the top of the portion of the film on the drawing rollers arranged in conical shape, and further, extends in an inverse deltaic triangular shape toward the lowermost drawing roller $\gamma_n$. The thick layer 11b of the film 11 becomes gradually narrower in width in a position above the drawing rollers $\gamma_1$, $\gamma_2$ to $\gamma_n$ extending downwardly. The thick layer 11b of film 11, that is, the undrawn portion, is similarly adjusted in the vicinity of the lowermost roll $\gamma_n$. At this time the undrawn portion or the thick layer 11b of film 11 remains at equal intervals in the circumferential direction of the film, and therefore, the swelling power due to air pressure acts over the entire circumference of the film 11, and thus no partial portion thereof is subjected to extreme swelling and drawing, as has heretofore been observed with conventionally employed apparatus. The present invention, on the contrary, allows the film to be free from the instability of bubbling and also free of bursting, or the like. Therefore, in position 11d where the film 11 is further transported downwardly, the film 11 is subjected to the redrawing in the circumferential direction only by means of the inside air pressure. In effecting this redrawing, the drawing should be carried out at a ratio of from 10 to 300 percent, and preferably in the range of from 10 to 100 percent, in the circumferential direction of the film 11 in the position of the last-mentioned drawing roller $\gamma_n$. Because of this redrawing, the film 11 is allowed to effect a complete drawing over the entire portion in the circumferential direction and the bordering line S and the drawing roller traces are completely blotted out.

The film 11 is drawn in the direction of the circumference in the conical portion by means of the drawing rollers $\gamma$, and after the last drawing roller $\gamma_n$ has been passed by film 11, it is feasible to accomplish the state of redrawing the film only with the air pressure depending upon the interrelationship of the taking-out velocity, drawing magnification, drawing temperature and the air pressure. However, if it is so arranged that the heater 37 is adjusted by allowing the conical portion and the redrawing portion to be independently operable from each other, the redrawing becomes much easier.

The thus drawn film 11 is cooled by water which is released from the cooling ring 38, and thereafter, it is guided by the guide rollers 39, 39, et., 40, 40, etc., into the flat belt shape, and is further pinched by the second pinch rollers 41, 42. The circumferential velocity of the second pinch rollers 41, 42 is faster than the circumferential velocity of the first pinch rollers 20 and 21, and therefore, the film 11 can also be drawn in the longitudinal direction. This longitudinal drawing can also be carried out by means of the bordering line.

After film 11a is drawn in the biaxial direction water is removed by means of nip rollers 44, 44, etc., and the film is dried by means of air knife 45, 45, and thereafter, while being transported into the interior of the oven 48 by means of the nip rollers 49, 49 and guide rollers 51, 51, and eventually is wound around the winder 52 after it has been taken outside of the oven 48 by means of nip rollers 50, 50.

In the above-mentioned apparatus, when the chain wheel 35 is rotated, the guide screw 29 rotates through the chain 33 and chain wheel 32, while nuts 30, 31 are transported along the guide screw 29, and thus, the angle of the links $m_1$, $m_2$, $m_3$ and $m_4$ and ascending-descending device 26 change. Consequently, smaller pipe 25 moves vertically up and down, and mandrels $O_1$, $O_2$ to $O_n$ rotate in the radial direction with the upper end thereof as the hub. Thus, the relative position of the drawing rollers $\gamma_1$, $\gamma_2$ to $\gamma_n$ provided in the respective mandrels $O_1$, $O_2$ to $O_n$ changes. Consequently, it is feasible to make adjustments in the drawing magnification in the direction of the circumference, and at the same time, it is possible to easily start up the drawing operation. For example, when tubular film 11 first enters the apparatus, it is required that smaller pipe 25 descends in order to minimize the slanting angle of the mandrels $O_1$, $O_2$ to $O_n$. When smaller pipe 25 moves vertically upwards, the slanting angle of mandrels $O_1$, $O_2$ to $O_n$ becomes greater while the distance between the respective drawing rollers $\gamma_1$, $\gamma_2$ to $\gamma_n$ is enlarged. Therefore, the initiation of the drawing operation becomes easier, and at the same time, because of the varied drawing magnification, it is feasible to make proper adjustments in the apparatus so that suitable drawing can be carried out. Mandrels $O_1$, $O_2$ to $O_n$ function to open and close by means of the up-down movement of smaller pipe 25, but it is permissible to allow pipe 14 to make a similar up-down movement instead.

The number of mandrels connected to pipe 14 and smaller pipe 25 is six, according to the embodiments shown in the accompanying drawings. However, this number is not significant as long as the number of mandrels is in excess of three, but preferably in the range of from four to 12.

The above-mentioned mandrel O should consist of an ordinary rod, but in order to minimize friction, and not to cause any slip-stick motion, a rod having less of a frictional co-efficient, for example, a fluorine resin rod, is preferable.

It is also feasible to use other ascending-descending apparatus than the pantagraph type, shown by number 17 in the accompanying drawings.

With respect to the drawing rollers $\gamma_1$, $\gamma_2$ to $\gamma_n$, it is preferable to use a plurality thereof having a small diameter.

The present invention provides a suitable method for carrying out tubular film drawing, and most importantly utilizing crystalline thermoplastic resins as polyamide resins, polystyrene, polyolefin resins, linear polyester resins, polycarbonate resins, polyvinyl chloride, polyvinylidene chloride and polyacrylonitrile.

The present invention is further illustrated by the following non-limiting examples.

EXAMPLE 1

Using an apparatus as illustrated in FIG. 1, an experiment was carried out on isotactic polypropylene of a 96 percent n-heptane extracted residue, having an intrinsic viscosity of 2.0 in a tetralin solution at 135° C. A thin tubular film extruded by the die at 240° C measured 70 mm in diameter and 0.2 mm in thickness, and the film was immediately subjected to cooling to 40° C in a cooling cylinder.

The thin tubular film was taken out by the first pinch roller (the circumferential velocity being 10 m/min) at a fixed velocity, and passed through the mandrel portion while being only slightly drawn. The specifications of the mandrel are as follows: eight wheels on each arm (the wheel diameter being 25 mm $\phi$ and wheel width being 8 mm $\phi$); the number of arms is six, while the length of the diagonal line of the bottom surface of the mandrel being 140 mm. When the tubular film is hermetically sealed with the second pinch roll, air (at a pressure of 0.1 kg/cm$^2$) is provided from the supporting rod of the mandrel to maintain the tubular film in a cylindrical shape.

When the temperature was elevated and reached equilibrium (in 15 minutes), the undrawn film had a thickness of 500$\mu$, while the circumferential velocity of the first and the second pinch roller was increased to 20 m/min. and 100 m/min., respectively.

When the pressure inside the tube was increased to 0.15 kg/cm$^2$, it was found that horizontal drawing of the film commenced as described in detail above. In other words, the necking initiation points appeared in 6 places, resulting in smoother horizontal drawing. It was also found that the final diameter of the drawn tube was 350 mm $\phi$, (the drawing magnification was 5 × 5). Thereafter, following post-treatment, such as thermosetting and the like, the film was wound. The thickness of the film was 20$\mu$, and the smooth drawn film was of a uniform quality.

The result obtained by conducting the above experiment using various mandrel diameters is illustrated in the following table:

TABLE 1

| Mandrel diameter (length of diagonal line at the base thereof) | 150 mm | 140 mm | 280 mm |
|---|---|---|---|
| Horizontal drawing magnification immediately after passing the mandrel | 1.5 times | 2 times | 4 times |
| Necking initiation point on the mandrel | no | yes | yes |
| Final horizontal drawing magnification | 5 times | 5 times | 5 times |
| Physical properties of the film | unevenness in thickness is greater than others | Good | Good |
| Appearance | Fair | Good | Unevenness observed on the surface of film (wheel traces) |
| Drawing stability | Poor partial swelling conspicuously observed | Good | Good |

EXAMPLE 2

Isotactic polypropylene having an intrinsic viscosity of 1.9 in a tetralin solution at 135° C and having a 98 percent n-heptane extracted residue was extruded at 230° C, and a thin tubular film having a thickness of 0.4 mm and a diameter of 200 mm was shaped at a taking-out velocity of 20 m/min. After cooling to 20°C with an apparatus as shown in FIG. 4, the film passed, respectively, the first pinch roller, the mandrel, the second pinch roller, the thermosetting area and subsequently was wound on winder 52.

When the temperature of the film was elevated to 130° C by heater 37, the mandrel was gradually opened while air at a pressure of 0.4 kg/cm$^2$ was sealed into the conical portion of the film. At this time, in the conical portion of the film, the necking lines appeared at approximately equal intervals, that is, the bordering line S, which was maintained in a certain fixed position. The film was installed so that it could leave the final roller $\gamma_n$ immediately prior to the disappearance of the necking line. Therefore, the drawing was effected by 30 percent only with the air pressure, resulting in swelling as much as 4.5 times in the horizontal direction.

Thereafter, cooling was conducted in cooling water until the temperature of the film reached 20° C. The circumferential velocity of the second pinch roller was 90 m/min., and the longitudinal magnification was 4.5 times. Thus, the film which was drawn in the biaxial direction was then subjected to thermosetting treatment in the thermosetting oven 48 at 140° C for 3 seconds, and thereafter, was wound onto winder 52. As a result, it was possible to effect a high-velocity production of film having a thickness of 20$\mu$ and having a smooth surface continuously for a period of 24 hours.

The following table illustrates a comparison of the physical properties of this film X with those of a biaxial oriented polypropylene film Y made by a conventional method.

TABLE 2

| | | X | Y |
|---|---|---|---|
| Haze (%) | | 1.2 | 1.4 |
| Tensile strength (kg/cm$^2$) | (Longit. | 1360 | 1300 |
| | (Horiz. | 1400 | 1590 |
| Tensile elongation (%) | (Longit. | 30 | 30 |
| | (Horiz. | 30 | 40 |
| Deviation in thickness (%) | | ± 7 | ± 23 |
| Appearance | | Good | Longitudinal striped patterns observed |

As has been explained in the foregoing description, the film is drawn in the direction of its circumference by virtue of the mandrel and of the fluid pressure. Because of this, the tubular film which is subjected to spreading is first maintained in a certain required shape by the mandrel, while the film moves over the drawing rollers in addition to having stability during the operation. The necking initiation points which are uniformly generated on the film lead to smooth drawing and orientation of the film. Further, because the fluid pressure acts simultaneously on the internal surface of the film, the contact pressure between the mandrel and the film becomes diminished, thus preventing the drawing rollers from making inroads into the film. Consequently, the movement of the film is carried out smoothly, and the film is free from sticking to or being scratched by the drawing rollers. In addition, because this film is subjected to redrawing in a position below the drawing roll in the direction of the circumference, even when the undrawn portion remains in carrying out the drawing in the aforementioned conical portion, it is feasible to allow the film to be drawn so that it could entirely have a uniform orientation and thickness over the whole circumference. And likewise, if the mandrel is adjusted such that all the remaining undrawn portion is made to contact the final drawing roll, the drawn portion does not contact the drawing roller at all, and consequently, the drawn film will be completely free of longitudinal stripes and scratches thereon.

What is claimed is:

1. A method for drawing thin tubular thermoplastic resin such as a crystalline polymer having a thickness in the range of 1 mm and less comprising the steps of:
   extruding a molten tube from a die having a ring like slit;
   quenching said tube without drawing;

heating said tube to a temperature range approximately 100°C. above the quenching temperature;

introducing fluid internally into said tube at a pressure greater than outside the tube;

simultaneously uniformly drawing said heated tube between 1.7 and 3.5 greater than its original quenched circumference with an internally positioned polyangular mandrel to thereby provide a plurality of necking initiating points on said tube;

continually drawing said tube as it leaves the polyangular mandrel by only the application of said fluid pressure, and quenching said tube.

2. A method according to claim 1, wherein said film is drawn in both the transverse and longitudinal directions.

3. A method according to claim 1, wherein from 25 to 90 percent of the desired transverse drawing magnification is accomplished by the film passing over the mandrel, the balance of 75 to 10 percent of the drawing being accomplished by the action of the fluid pressure acting within said tubular film.

4. A method according to claim 1, wherein the transverse drawing caused by the mandrel is carried out to the extent that undrawn portions of said tubular film remain at the lowermost portion of each edge of said mandrel.

5. A method according to claim 1, wherein air pressure is utilized as the fluid pressure.

6. A method according to claim 1, wherein said thermoplastic resin is selected from the group consisting of polypropylene, polyamide resins, polystyrene, polyolefin resins, linear polyester resins, polycarbonate resins, polyvinyl chloride, polyvinylidene chloride and polyacrylonitrile.

* * * * *